US007378165B2

(12) United States Patent
Brignone et al.

(10) Patent No.: US 7,378,165 B2
(45) Date of Patent: May 27, 2008

(54) SYSTEM AND METHOD FOR PROVIDING ELECTRICAL POWER TO AN EQUIPMENT RACK USING A FUEL CELL

(75) Inventors: Cyril Brignone, Mignaloux (FR); Ratnesh Sharma, Union City, CA (US); Salil Pradhan, Santa Clara, CA (US); Geoff M. Lyon, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 979 days.

(21) Appl. No.: 10/425,169

(22) Filed: Apr. 29, 2003

(65) Prior Publication Data

US 2004/0219415 A1    Nov. 4, 2004

(51) Int. Cl.
*H01M 8/00*    (2006.01)
(52) U.S. Cl. ............................. 429/13; 429/12
(58) Field of Classification Search ................ 429/12, 429/13
See application file for complete search history.

(56) References Cited

U.S. PATENT DOCUMENTS

| 4,517,670 | A  | * | 5/1985  | Ulug ......................... 370/463 |
| 6,071,385 | A  |   | 6/2000  | Long |
| 6,420,059 | B1 | * | 7/2002  | Surampudi et al. ............ 429/13 |
| 6,468,682 | B1 | * | 10/2002 | Fuglevand et al. ............ 429/26 |
| 6,569,555 | B1 | * | 5/2003  | Faris et al. .................... 429/27 |
| 6,743,536 | B2 |   | 6/2004  | Fuglevand |
| 6,773,839 | B2 |   | 8/2004  | Fuglevand et al. |
| 6,798,660 | B2 |   | 9/2004  | Moss et al. |
| 2002/0193978 | A1 |   | 12/2002 | Soudier |
| 2003/0035985 | A1 |   | 2/2003  | Colborn |
| 2003/0070850 | A1 | * | 4/2003  | Reid et al. .................. 180/68.5 |
| 2004/0028961 | A1 |   | 2/2004  | Acker |
| 2004/0043274 | A1 |   | 3/2004  | Scartozzi et al. |
| 2004/0053090 | A1 |   | 3/2004  | Hanson et al. |
| 2004/0053093 | A1 | * | 3/2004  | Colborn et al. ............... 429/23 |
| 2004/0164702 | A1 |   | 8/2004  | Holmes |
| 2004/0219397 | A1 |   | 11/2004 | Lyon et al. |
| 2004/0219405 | A1 |   | 11/2004 | Lyon et al. |
| 2004/0219415 | A1 |   | 11/2004 | Brignone et al. |
| 2004/0265662 | A1 |   | 12/2004 | Brignone et al. |
| 2005/0128689 | A1 |   | 6/2005  | Caci et al. |

OTHER PUBLICATIONS

Webpage of Lytron, www.lytron.com, p. 1 (2002).
Webpage of PSK Climate control solutions, www.enclosureinfo.com/tech/tittal/over/v1_17209000_01, pp. 1-3 (2003).
Webpage of H2FC investor's Weekly Newsletter, www.h2fc.com/1apps.html, pp. 1-4(2003).

* cited by examiner

*Primary Examiner*—Patrick Ryan
*Assistant Examiner*—Ben Lewis

(57) ABSTRACT

A system and method for providing electrical power to an equipment rack using a fuel cell is disclosed. The system discloses: an equipment rack; an electrical device located within the rack; a fuel cell, located within the rack, for generating electrical power; and an electrical bus coupling the electrical power generated by the fuel cell to the electrical device. The method discloses: generating electrical power with a fuel cell located in an equipment rack; transmitting the electrical power from the fuel cell to an electrical device located in the equipment rack over an electrical bus; and adjusting the electrical power generated by the fuel cell in response to electrical power consumed by the electrical device.

16 Claims, 4 Drawing Sheets

SYSTEM AND METHOD FOR PROVIDING ELECTRICAL POWER TO AN EQUIPMENT RACK USING A FUEL CELL

BACKGROUND OF THE INVENTION

1. Field of the Invention

The present invention relates generally to systems and methods for powering equipment racks, and more particularly to providing electrical power to an equipment rack using a fuel cell.

2. Discussion of Background Art

Modern service and utility based computing is increasingly driving enterprises toward consolidating large numbers of electrical servers, such as blade servers, and their supporting devices into massive data centers. A data center is generally defined as a room, or in some cases, an entire building or buildings, that houses numerous printed circuit (PC) board electronic systems arranged in a number of racks. Such centers, of perhaps fifty-thousand nodes or more, require that such servers be efficiently networked, powered, and cooled.

Typically such equipment is physically located within a large number of racks. Multiple racks are arranged into a row. The standard rack may be defined according to dimensions set by the Electronics Industry Association (EIA) for an enclosure: 78 in. (2 meters) wide, 24 in. (0.61 meter) wide and 30 in. (0.76 meter) deep.

Standard racks can be configured to house a number of PC boards, ranging from about forty (40) boards, with future configuration of racks being designed to accommodate up to eighty (80) boards. Within these racks are also network cables and power cables, such as shown in FIG. 1. The PC boards typically include a number of components, e.g., processors, micro-controllers, high-speed video cards, memories, and semi-conductor devices, that dissipate relatively significant amounts of heat during the operation. For example, a typical PC board with multiple microprocessors may dissipate as much as 250 W of power. Consequently, a rack containing 40 PC boards of this type may dissipate approximately 10 KW of power.

Generally, the power used to remove heat generated by the components on each PC board is equal to about 10 percent of the power used for their operation. However, the power required to remove the heat dissipated by the same components configured into a multiple racks in a data center is generally greater and can be equal to about 50 percent of the power used for their operation. The difference in required power for dissipating the various heat loads between racks and data centers can be attributed to the additional thermodynamic work needed in the data center to cool the air. For example, racks typically use fans to move cooling air across the heat dissipating components for cooling. Data centers in turn often implement reverse power cycles to cool heated return air from the racks. This additional work associated with moving the cooling air through the data center and cooling equipment, consumes large amounts of energy and makes cooling large data centers difficult.

In practice, conventional data centers are cooled using one or more Computer Room Air Conditioning units, or CRACs. The typical compressor unit in the CRAC is powered using a minimum of about thirty (30) percent of the power required to sufficiently cool the data centers. The other components, e.g., condensers, air movers (fans), etc., typically require an additional twenty (20) percent of the required cooling capacity.

As an example, a high density data center with 100 racks, each rack having a maximum power dissipation of 10 KW, generally requires 1 MW of cooling capacity. Consequently, air conditioning units having the capacity to remove 1 MW of heat generally require a minimum of 300 KW to drive the input compressor power and additional power to drive the air moving devices (e.g., fans and blowers).

One problem with current rack power systems is a complete reliance on a central power grid. Such reliance subjects equipment racks to data center wide power failure conditions, which can result in disruptions in service and loss of data. While some equipment racks may have a battery backup, such batteries are only designed to preserve data and permit graceful server shutdown upon experiencing a power loss. Such batteries are not designed or sized for permitting equipment within the rack to continue operating at full power though.

Another problem with conventional systems is that each equipment rack's power needs can vary substantially, depending upon: how many servers or other devices are located in the rack; whether such devices are in a standby mode or are being fully utilized; and the variations in rack cabling losses. While central high-voltage/current power sources located elsewhere in the data center can provide the necessary power, the aforementioned power consumptions variations often result in greater overall data center transmission line losses, and more power-line transients and spikes, especially as various rack equipment goes on-line and off-line. Due to such concerns, power-line conditioning and master switching equipment is typically added to each rack, resulting in even greater losses and heat generation.

Each equipment rack's cooling needs can also vary substantially depending upon how many servers or other devices are located in the rack, and whether such devices are in a standby mode, or being fully utilized. Central air conditioning units located elsewhere in the data center provide the necessary cooling air, however, due to the physical processes of ducting the cooling air throughout the data center, a significant amount of energy is wasted just transmitting the cooling air from the central location to the equipment in the racks. Cabling and wires internal to the rack and under the data center floors blocks much of the cooling air, resulting in various hot-spots that can lead to premature equipment failure.

In response to the concerns discussed above, what is needed is a system and method for powering equipment racks that overcomes the problems of the prior art.

SUMMARY OF THE INVENTION

The present invention is a system and method for providing electrical power to an equipment rack using a fuel cell. The system of the present invention, includes: an equipment rack; an electrical device located within the rack; a fuel cell, located within the rack, for generating electrical power; and an electrical bus coupling the electrical power generated by the fuel cell to the electrical device.

The method of the present invention includes the elements of: generating electrical power with a fuel cell located in an equipment rack; transmitting the electrical power from the fuel cell to an electrical device located in the equipment rack over an electrical bus; and adjusting the electrical power generated by the fuel cell in response to electrical power consumed by the electrical device.

These and other aspects of the invention will be recognized by those skilled in the art upon review of the detailed description, drawings, and claims set forth below.

DETAILED DESCRIPTION OF THE PREFERRED EMBODIMENT

The present invention includes two main embodiments. Which embodiment is preferred depends upon how the present invention is implemented. In one embodiment, fuel cell technology is used within an equipment rack as a back-up to a data center's main power grid. In another embodiment of the present invention, fuel cell technology is used within the rack as the only power source, and thereby reduces or eliminates inter-rack power cabling. Fuel cell liquids, such as methanol, can also be used to help cool equipment within the rack. All of these capabilities make the present invention advantageous over the prior art.

Figure 1:
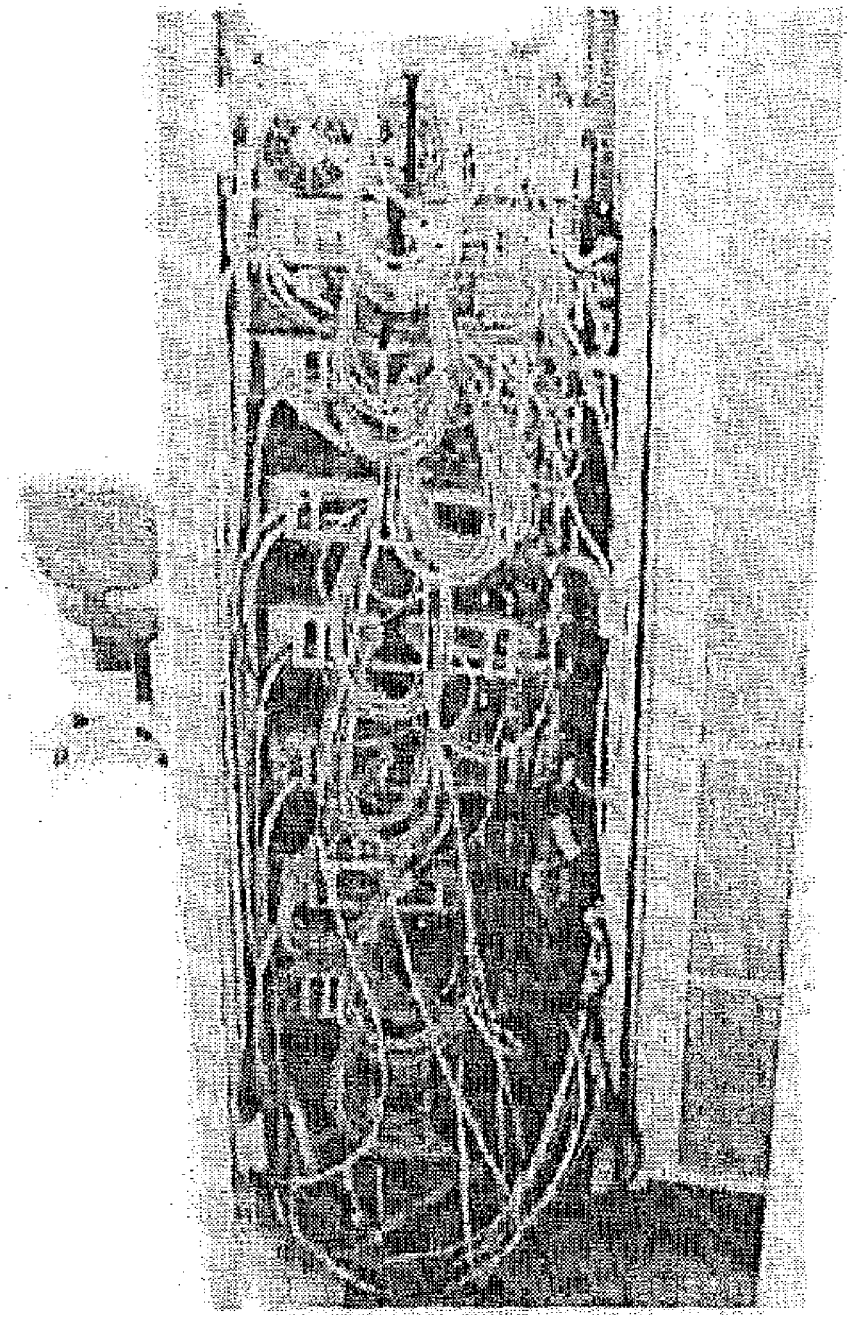
FIG. 1 is a pictorial diagram of electrical cabling within an equipment rack.
Figure 2:
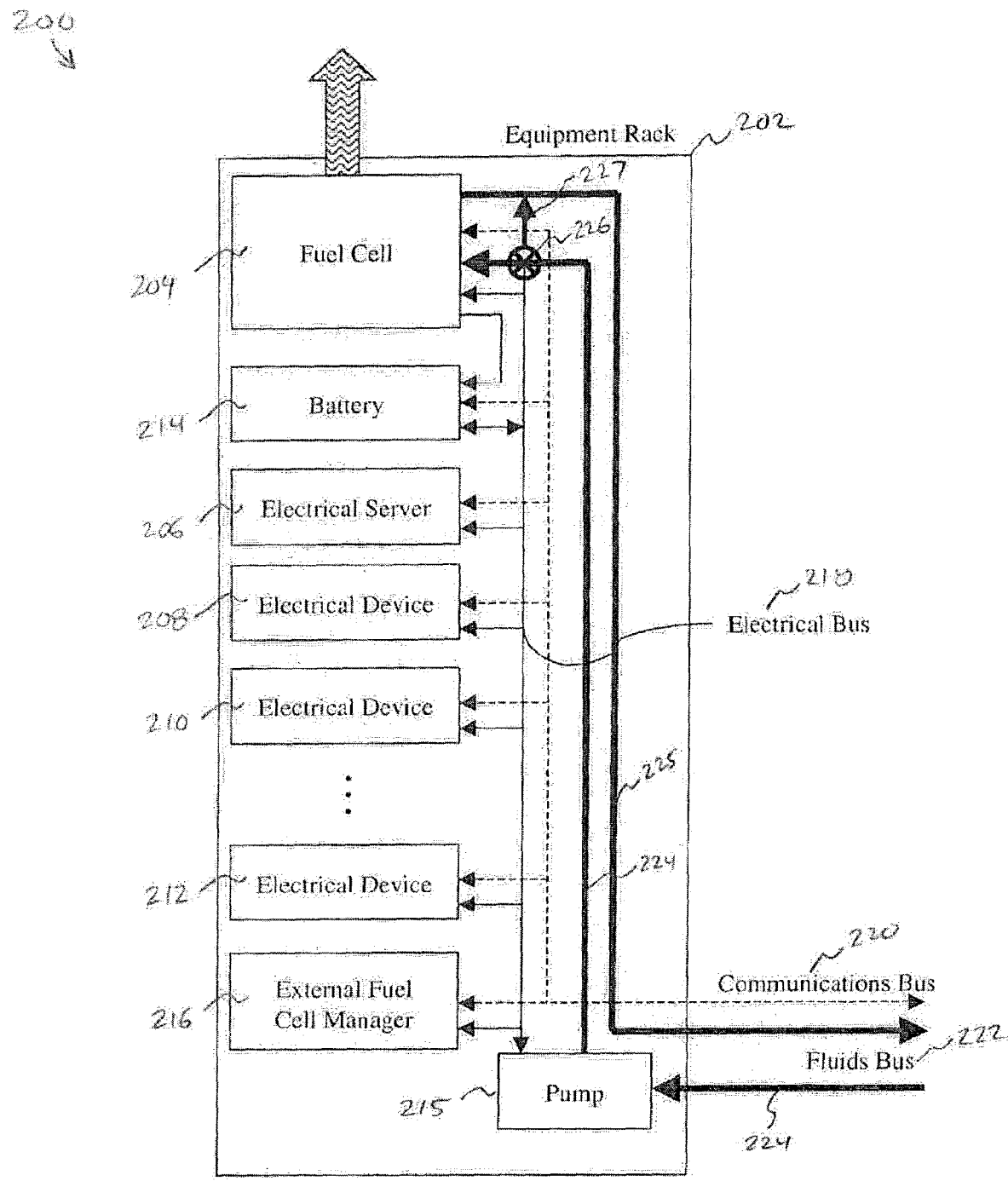
FIG. 2 is a block diagram of one embodiment of a system for providing electrical power to an equipment rack using a fuel cell.
Figure 3A:
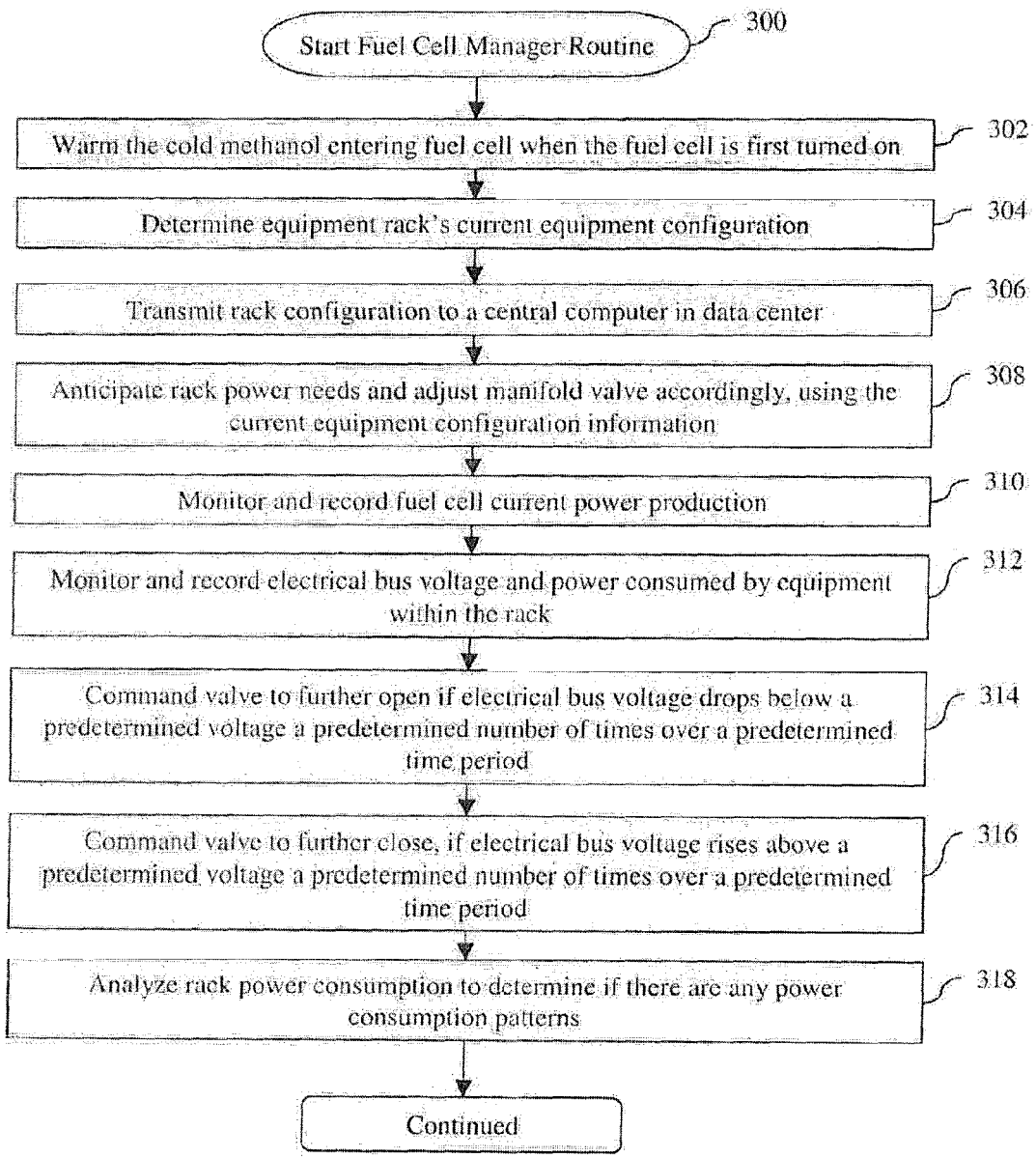
FIG. 3 is a flowchart of one embodiment of a method for providing electrical power to an equipment rack using a fuel cell.
Figure 3B:
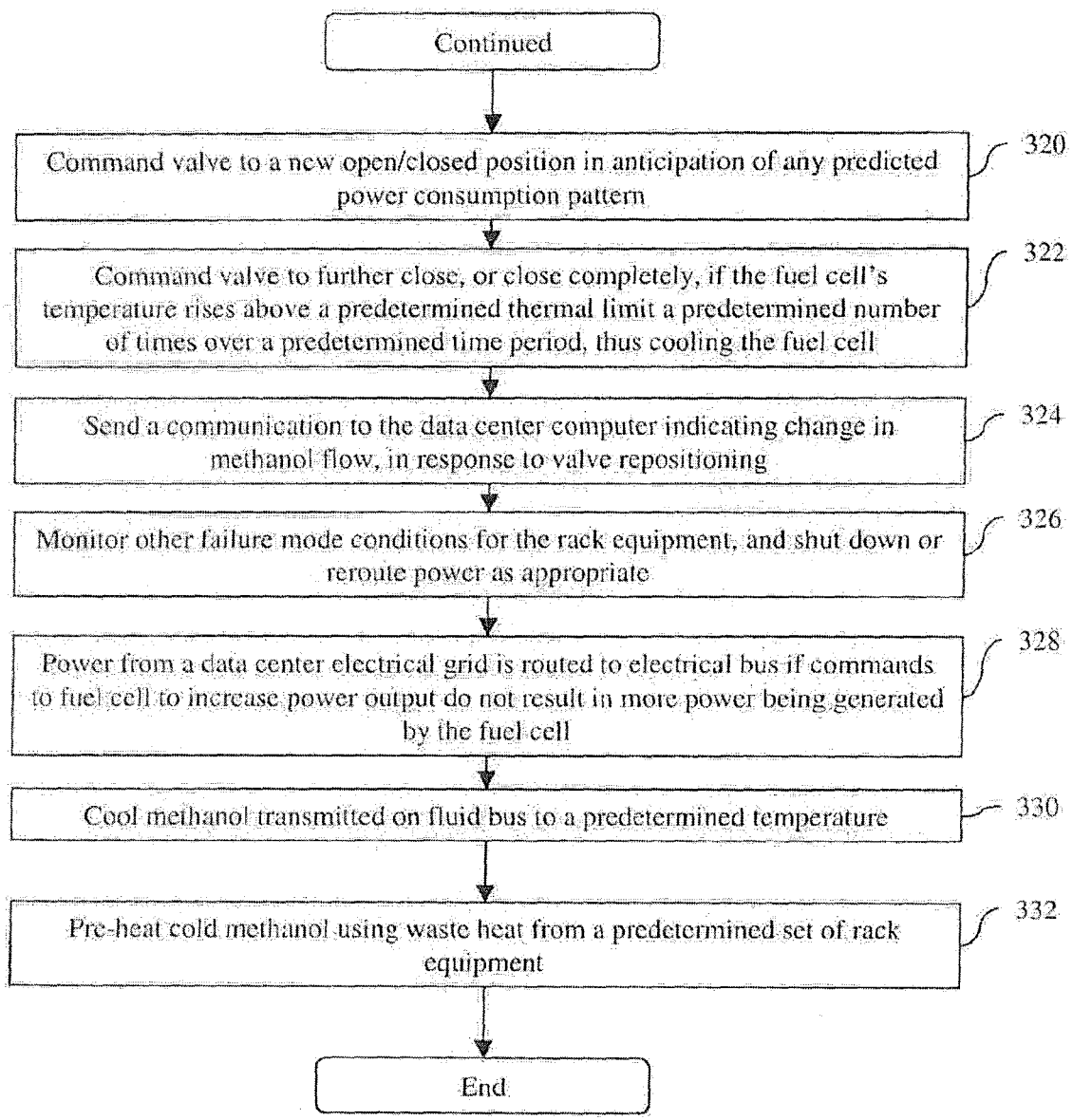

FIG. 2 is a block diagram of one embodiment of a system 200 for providing electrical power to an equipment rack 202 using a fuel cell 204. FIG. 3 is a flowchart of one embodiment of a method 300 for providing electrical power to the equipment rack 202 using the fuel cell 204. The system 200 and method 300 are herein described together in just one of many possible embodiments.

The equipment rack 202 refers generally to any structure able to hold a variety of electrical and non-electrical equipment. More narrowly, the equipment rack 202 could be termed a device rack, and even more so, a server rack.

The equipment rack 202, in the one embodiment discussed herein, is presumed to be located within a data center (not shown) of a predetermined size. The data center includes a variety of centralized resources, and stores, which are discussed below as needed. Those skilled in the art however will know that the rack 202 could alternatively be located in a variety of other environments.

The rack 202 in the one embodiment of the present invention, shown in FIG. 2, includes the fuel cell 204, an electrical server 206, a set of electrical devices 208 through 212, a battery 214, a pump 215, and an external fuel cell manager 216. Those skilled in the art will recognize that the number of electrical servers and other devices in the rack may be varied depending upon how the present invention is implemented.

The fuel cell 204 is preferably a Direct Methanol Fuel Cell (DMFC), although those skilled in the art recognize which other fuel cells may work as well. The fuel cell 204 includes a hydrogen circuit and an oxidizer circuit separated by a semi-permeable catalytic membrane. It is the interaction between the hydrogen and the oxidizer across the membrane which produces current flow and thus electrical power from the fuel cell 204. On the hydrogen circuit side of the membrane, a mixture of methanol and water enter into the fuel cell 204, while a mixture of methanol, water, and carbon dioxide exit. On the oxidizer circuit side of the membrane, an oxidizer, such as oxygen enters the fuel cell 204, while a mixture of oxygen, water, and nitrogen exit. The gasses exiting the oxidizer circuit are typically vented to the air, while the water is mixed back in with the water and methanol exiting the hydrogen circuit side of the membrane.

Thus the fuel cell 204 typically requires at least two fluid ports, an input port for receiving the incoming methanol/water mixture and an output port for exhausting the outgoing methanol, carbon dioxide, and water mixture. During normal operation, the incoming fluid mixture is preferably very cold so that the methanol can be used to cool equipment within the rack 202. However, an added benefit of cold methanol is that the methanol's volatility is reduced.

During normal operation, the fuel cell 204 generates heat, and thus the fuel cell 204 is preferably located at or near the top of the equipment rack 202, permitting this heat to rise and exit the rack 202 more easily, and thereby keeping the other devices and servers in the rack 202 cooler.

The electrical server 206, the set of electrical devices 208 through 212 include industry standard blade servers, and other electrically powered devices. An electrical bus 218 routes electrical power generated from the fuel cell 204 through the battery 214 to the server 206, the devices 208 through 212, and the external fuel cell manager 216. The battery 214 is preferably connected between the fuel cell 204 and the electrical bus 218, since the fuel cell's 204 output voltage is not otherwise easy to regulate. The battery 214 helps provide a steady regulated voltage on the electrical bus 218. The fuel cell manager 216 preferably monitors the battery's 214 voltage as well as the battery's 214 charge rate from the fuel cell 204 and discharge rate from the electrical bus 218.

A communications bus 220 routes data between the server, devices, and fuel cell manager, as well as between the rack 202 and the rest of the data center. Preferably the communications bus 220 is a fiber optic cable, so as to minimize the number of electrical paths within the equipment rack. However, the communications bus 220 could also be of another type.

A fluids bus 222, external to the rack 202, routes incoming and outgoing fluids to the rack 202 from the data center's centralized fluid stores and repositories. The fluids bus 222 connects to a fluid manifold, which is internal to the rack 202. Since the fuel cell 204 as discussed herein preferably is a methanol based fuel cell, the manifold preferably includes an methanol input conduit 224, a methanol output conduit 225, a valve 226, and a bypass path 227. Those skilled in the art will recognize that other embodiments of the present invention may use different fuel cell technology, which require a different, but functionally equivalent, manifold. The input conduit 224 routes methanol through the pump 215 to an input port on the fuel cell 204 and the output conduit 225 routes methanol from an output port on the fuel cell 204, each coupled using leak-resistant no-drip connectors. The pump 215 is used to maintain fluid pressure within the inlet conduit 224 as fuel cell fluid needs vary. In an alternate embodiment a bypass control valve can be substituted for the pump. The bypass control valve would be located at the same place as the pump but would continually bypass a predetermined amount of fluid from the input conduit to the output conduit in order to maintain a prescribed pressure an the input port of the fuel cell 204.

The valve 226 is coupled to the external fuel cell manager 216 via the electrical bus 218 and in response to commands from the manager 216 controls fluid flow from the inlet conduit 224 to the fuel cell 204. The valve 226 is preferably a three-way valve having an inlet port, an outlet port, and a bypass port. The inlet port of the valve 226 receives incoming fluids from the input conduit 224. The outlet port of the valve 226 connects to the fuel cell's 204 inlet port. The bypass port of the valve 226 connects to the output conduit 225 via bypass path 227.

The valve can preferably be adjusted continuously from fully-open and to fully-closed. When the valve is fully-open, all incoming fluids are routed to the fuel cell input port. However, when the valve is fully-closed, all incoming fluids bypass the fuel cell and are routed to the outlet conduit 225.

Since, the fuel cell 204 needs methanol in order to produce electricity, the more methanol available to the fuel cell 204, the more electricity the fuel cell 204 can produce, whereas, the less methanol made available to the fuel cell 204, the less electricity the fuel cell 204 can produce. Thus, by varying the amount of methanol supplied to the fuel cell 204 input port, the valve 226 controls how much electricity the fuel cell 204 can produce and thus the valve 226 is functionally equivalent to a conventional power switch. Unlike power switches, however, the valve 226 does not waste as much electricity and generate heat.

The external fuel cell manager 216 is preferably a computer operated device which manages the fuel cell 204 and the valve 226, according to the method 300 of FIG. 3. When the fuel cell 204 is first turned on, the external fuel cell manager 216, in step 302, activates electrical heaters to warm the cold methanol entering the fuel cell 204 input port. Pre-heating the incoming methanol permits the fuel cell 204 to reach its normal operating efficiency level more quickly. The heaters may be powered either from the battery 214 internal to the rack 202, or some external power source. Since the fuel cells themselves also generate heat during operation, such heat can be used to continue pre-heating the incoming methanol, so that the electrical heaters may be turned off.

In step 304, the external fuel cell manager 216 determines the rack's 202 current equipment configuration. The equipment configuration refers to a number of power consuming servers and other devices within the rack 202 and their individual power needs. The fuel cell manager 216 can obtain this information either by polling the server 206 and devices 208 through 212 over the communications bus 220, or by referring to a pre-loaded data table. The fuel cell manager 216 also calculates its own power consumption needs. In step 306, the external fuel cell manager 216 transmits the rack's 202 configuration to a central computer (not shown) in the data center which controls fluid bus 222 flow throughout the data center. In step 308, the external fuel cell manager 216 anticipates the rack's 202 power needs and adjusts the valve 226 accordingly, using the current equipment configuration information.

In step 310, the fuel cell manager 216 monitors and records the fuel cell's 204 current power production. In step 312, the fuel cell manager 216 monitors and records the electrical bus 218 voltage and the power consumed by the server 206 and other devices 208 through 216 within the equipment rack 202. If the electrical bus 218 voltage drops below a predetermined voltage a predetermined number of times over a predetermined time period, the fuel cell manager 216, in step 314, commands the valve 226 to further open, thus permitting more methanol to flow to the fuel cell 204. If the electrical bus 218 voltage rises above a predetermined voltage a predetermined number of times over a predetermined time period, the fuel cell manager 216, in step 316, commands the valve 226 to further close, thus restricting methanol flow to the fuel cell 204. Preferably the electrical bus 218 voltage is monitored at or near the battery 214 connected between the fuel cell 204 and the electrical bus 218. The battery is needed since the fuel cell's 204 output voltage is not easy to directly regulate.

In step 318, rack power consumption is analyzed by the fuel cell manager 216 to determine if there are any relatively predictable power consumption patterns. In step 320, the fuel cell manager 216 commands the valve 226 to a new open/closed position in anticipation of the predicted power consumption pattern. Power consumption anticipation is preferred since fuel cells do not instantaneously vary their power output with changes in methanol flow. If the fuel cell's 204 temperature rises above a predetermined thermal limit a predetermined number of times over a predetermined time period, the fuel cell manager 216, in step 322, commands the valve 226 to further close, or close completely, thus cooling the fuel cell 204.

In step 324, the fuel cell manager 216 sends a communication to the data center computer indicating the change in methanol flow, in response to valve 226 repositioning, so that the data center computer can maintain fluid bus 222 pressure. In step 326, the fuel cell manager 216, also monitors a variety of other failure mode conditions for the server 206 and other devices 206 through 212, and shuts down or reroutes power to such server or other devices as appropriate.

As mentioned above, in one embodiment of the present invention discussed above, the fuel cell 204 and the battery 214 function as the equipment rack's 202 sole power sources, thus localizing all electrical cabling within the rack 204. By providing for all of the rack's 204 power needs internally, there no longer a need for a large high amperage electrical grid within the data center with its associated lossy cabling.

However, in a second alternate embodiment of the present invention, the fuel cell 204 operates in conjunction with a standard data center electrical grid (not shown). In this embodiment, the fuel cell 204 functions as a primary power source, while the electrical grid provides power should the fuel cell 204 fail and during peak or transient high power demand times. Such an alternative embodiment adds the following step to the method 300: if the electrical bus 218 voltage drops below a predetermined voltage a predetermined number of times over a predetermined time period, and the fuel cell manager's 216 command, in step 314, does not result in the fuel cell 204 generating more electrical power, the fuel cell manager 216, in step 328, permits more power to flow into the rack 202 from the data center electrical grid. Which of the two embodiments is preferred depends upon how the present invention is implemented.

While any type of fuel cell can power the equipment rack 202, the use of methanol fuel cells present certain further opportunities to cool the rack 202 as well. Methanol tends to be very volatile at room temperature, and can easily ignite or evaporate. Cooling the methanol, pumped to the rack 202, significantly reduces such volatility. However, methanol fuel cells also operate most efficiently when their incoming methanol stream is warmed/heated to a predetermined temperature. Such preferred engineering guides present an opportunity to both cool the equipment rack 202 and pre-heat the methanol for the fuel cell 204 simultaneously. Thus in step 330, methanol transmitted on the fluid bus 222 is cooled to a predetermined temperature. As the methanol passes through the fluid manifold, or somewhere internal to the fuel cell 204 itself, the cold methanol is pre-heated, in step 332, using waste heat from a predetermined set of equipment within the rack 202. Any pre-heating of the methanol preferably occurs after the methanol is used for cooling so that ability of the methanol to cool the rack equipment is maximized. Thus, within the present invention, power production and cooling are symbiotically combined, thereby further simplifying the rack's construction and ease of maintenance and operation.

While one or more embodiments of the present invention have been described, those skilled in the art will recognize that various modifications may be made. Variations upon and modifications to these embodiments are provided by the present invention, which is limited only by the following claims.

What is claimed is:

1. A system for supplying power, comprising:
an equipment rack;
electrical devices located within the rack;
a fuel cell, located within the rack, for generating electrical power;
an electrical bus coupling the electrical power generated by the fuel cell to the electrical devices; and
a fuel cell manager within the rack to:
determine an equipment configuration in the rack, the electrical devices being part of the equipment configuration, and
adjust an amount of electricity produced by the fuel cell based on the equipment configuration.

2. The system of claim 1:
further comprising, a data center, having an electrical bus;
wherein the equipment rack is located within the data center; and
wherein the electrical bus of the data center is electrically isolated from the electrical bus within the equipment rack.

3. The system of claim 1 wherein the electrical device is a server.

4. The system of claim 1:
wherein the fuel cell uses methanol as fuel.

5. The system of claim 1, further comprising:
a valve, for varying fuel supplied to the fuel cell, in response to commands from the fuel cell manager.

6. The system of claim 1, further comprising:
a communications bus, coupling the fuel cell and the electrical devices to the fuel cell manager, for transmitting data relating to the electrical power generated by the fuel cell and electrical power consumed by the electrical devices to the fuel cell manager.

7. The system of claim 6:
wherein the communications bus includes a fiber optic cable.

8. The system of claim 1:
wherein the fuel cell is located in a top half of the equipment rack.

9. The system of claim 1:
further comprising a battery coupled to the electrical bus, for sourcing and sinking electrical power.

10. The system of claim 1, further comprising a battery electrically connected between the fuel cell and the electrical bus, the electrical power generated by the fuel cell routed through the battery to the electrical bus.

11. The system of claim 5, wherein the fuel cell manager adjusts the amount of electricity produced by the fuel cell by adjusting the valve to control an amount of fuel supplied to the fuel cell, wherein the valve is adjusted according to the equipment configuration.

12. The system of claim 11, further comprising a heater to warm the fuel supplied to the fuel cell.

13. The system of claim 11, wherein the fuel cell manager monitors a voltage of the electrical bus and adjusts the valve in response to the monitored voltage.

14. The system of claim 1, wherein the fuel cell manager analyzes power consumption in the rack and determines a power consumption pattern, the fuel cell manager to adjust an amount of electricity produced by the fuel cell according to the power consumption pattern.

15. The system of claim 1, further comprising a fuel cell manager to enable electrical power to flow from an external electrical grid into the rack in response to determining that the fuel cell is unable to produce more electrical power.

16. The system of claim 1, wherein the equipment configuration includes a number of the electrical devices in the rack and power needs of the electrical devices.

* * * * *